United States Patent [19]
Kuwica

[11] Patent Number: 4,903,552
[45] Date of Patent: Feb. 27, 1990

[54] GUIDE FOR FILING SAW CHAIN

[76] Inventor: Daniel Kuwica, Unit 5 - 3009 Murray Street, Port Moody, British Columbia, Canada, V3H/1Y3

[21] Appl. No.: 247,880

[22] Filed: Sep. 22, 1988

[51] Int. Cl.4 ............................................. B23D 63/12
[52] U.S. Cl. .......................................... 76/36; 29/80; 76/25 A
[58] Field of Search ............... 76/25 A, 36, 31; 29/78, 29/80

[56] References Cited

U.S. PATENT DOCUMENTS

| | | | |
|---|---|---|---|
| 3,494,228 | 2/1970 | Sim | 76/36 |
| 3,518,900 | 7/1970 | Ehlen et al. | 76/25 A |
| 4,010,661 | 3/1977 | Fletcher | 76/36 |
| 4,012,969 | 3/1977 | Granberg | 76/36 |

FOREIGN PATENT DOCUMENTS 2727447  4/1978  Fed. Rep. of Germany ..... 76/25 A

Primary Examiner—Roscoe V. Parker
Attorney, Agent, or Firm—Christie, Parker & Hale

[57] ABSTRACT

A sharpening guide for a file to be used in sharpening a chain saw chain. The guide a semi-cylindrical body is a close fit on a round file. There is a first support for the file at one end of the body. The support has an opening to receive the round file. The dimensions of semi-cylindrical body and the support allow the file to rotate in the guide.

10 Claims, 1 Drawing Sheet

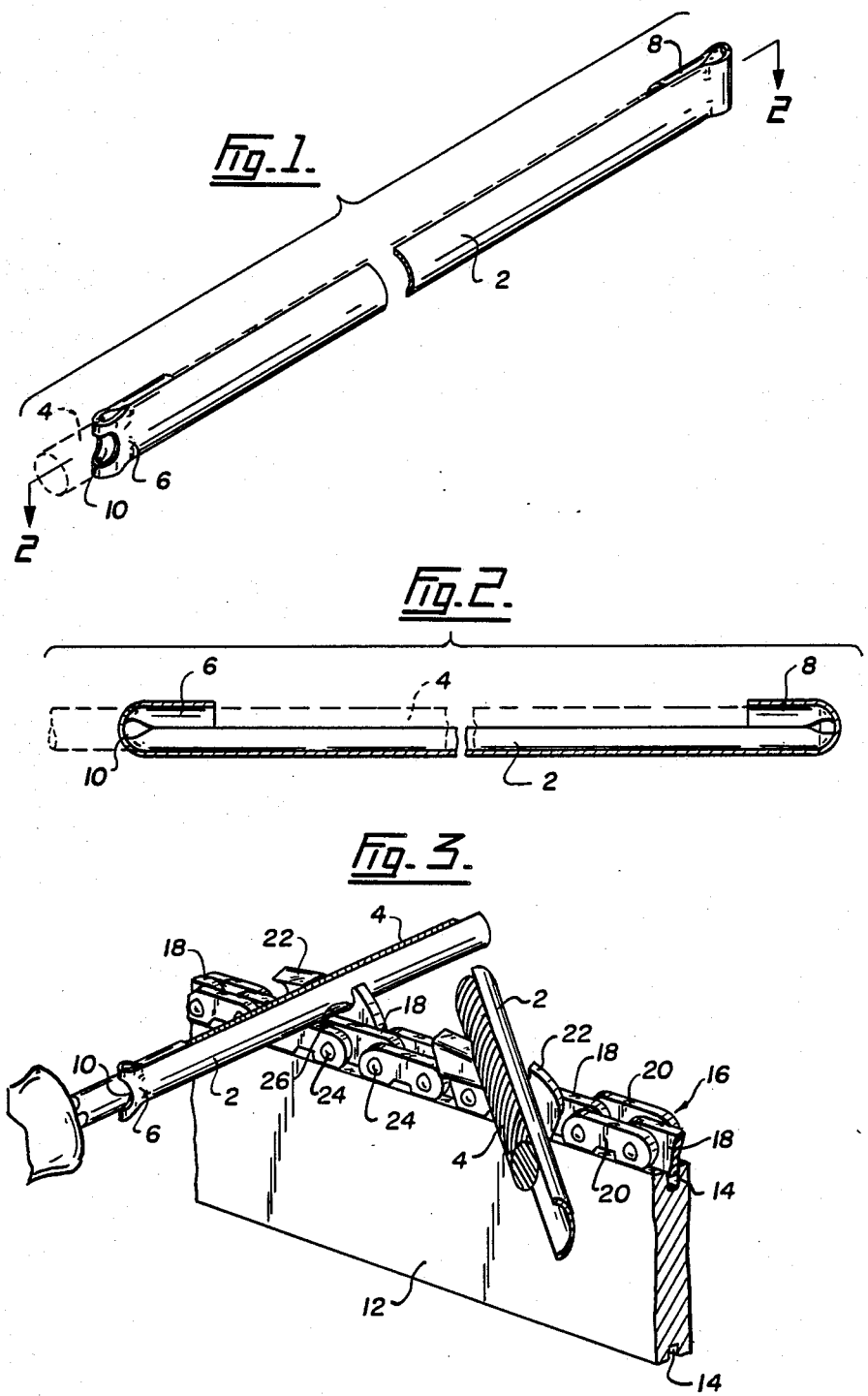

GUIDE FOR FILING SAW CHAIN

FIELD OF THE INVENTION

This invention relates to a guide for a file to be used in sharpening a chain saw chain.

DESCRIPTION OF THE PRIOR ART

Chain saws are widely used in logging. They comprise a housing carrying a small gasoline motor with an output shaft carrying a drive sprocket. A chain extends around a chain bar which supports and guides the chain. The chain also engages and is driven by the drive sprocket. The chain has drive teeth to engage the drive sprocket and cutter teeth, which cut the wood. These cutter teeth must be kept sharp and properly maintained. The chain moves at high speed and although chain saws have proved to be a huge advantage in logging they can be very dangerous tools to use, especially when not properly maintained, and not properly sharpened.

An improperly sharpened chain can increase the risk of the chain saw kicking back, that is being forced out of the wood, towards the operator. This kicking back is a major hazard in operating a chain saw.

Numerous devices are known to assist the operator in sharpening chain teeth. It must be remembered that a chain will be sharpened usually in the woods, without the benefit of a machine shop to ensure that the chain is properly located and the sharpening file presented at precisely the correct horizontal and vertical angle to the chain. Because the chain is used in the woods it is also essential that the sharpening tool be light and easily manipulated and carried.

There are essentially two cutting angles on a saw chain cutter; first the top plate cutting angle and secondly, the side plate cutting angle.

These angles are of course sharpened correctly by the factory but a person sharpening free hand without a guide will have great difficulty sharpening the two cutting angles correctly.

If the file is held too high in the cutter then the top plate cutting angle becomes blunt and will not feed into the wood.

If the file is allowed to drop too low in the cutter then too much metal is filed out of the side plate and a "Hook" occurs. The top plate cutting angle also becomes too severe, causing the cutter to grab aggressively into the wood and to dull fast. The latter two conditions increase the chance of the saw bar kicking back towards the operator.

The prior art teaches devices to hold a round file for sharpening cutter edges of the cutter teeth. For example U.S. Pat. No. 2,737,830 to Siverson et al discloses a filing guide with a longitudinally extending slot. The slot enables the guide to be placed around the tooth on the saw chain. U.S. Pat. No. 3,365,805 to Carlton discloses a saw chain filing guide having a flat plate with a slot to straddle a depth gauge and side plate on a cutter tooth to be sharpened. U.S. Pat. No. 4,473,958 to Atkinson discloses a filing guide with a first slot to receive the depth gauge and a second slot to receive a safety projection.

Other patents known to applicant and believed to be of general interest are U.S. Pat. No. 4,412,463 to Berens; U.S. Pat. No. 4,438,667 to Hannah; U.S. Pat. No. 3,283,615 to Keparkt; U.S. Pat. No. 4,228,702 to Stewart et al; U.S. Pat. No. 3,670,600 to Arff; U.S. Pat. No. 3,438,286 to Silvon; U.S. Pat. No. 4,404,872 to Fritz and U.S. Pat. No. 3,733,933 to Longbreak.

In addition applicant's U.S. Pat. No. 4,745,827 describes and claims a filing guide that has a rigid body with a flat top and with a front edge shaped to abut against the inner links of the chain. Spaced apart elongated members extend perpendicularly from the body adjacent the front edge. The members are shaped to fit within the spaces between the inner links. The body is shaped to receive a round file. The arrangement is such that a cutter tooth of the chain can be filed by the round file when the filing guide is positioned with the members inserted in the spaces between the inner links.

My above U.S. patent describes an invention that is simple to use and has provided excellent results. However, it is believed that the present invention is an even simpler approach to the problem of sharpening a saw chain, particularly in the woods.

SUMMARY OF THE INVENTION

Accordingly, the present invention is a sharpening guide for a file to be used in sharpening a chain saw chain, the guide comprising:
- a substantially semi-cylindrical body adapted to be a close fit on a round file of predetermined diameter;
- a first support for the file at one end of the body;
- the first cylindrical support including an opening to receive the round file; and
- the dimensions of a semi-cylindrical body and the first support allowing the file to rotate in the guide.

The invention also includes a round file in combination with the above guide.

DESCRIPTION OF THE DRAWINGS

Aspects of the invention are illustrated, merely by way of example, in the accompanying drawings in which:

FIG. 1 is a perspective view of a guide according to the present invention;

FIG. 2 is on the line 2—2 in FIG. 1; and

FIG. 3 guide of FIGS. 1 and 2 in use in sharpening a saw chain.

DESCRIPTION OF THE PREFERRED EMBODIMENTS

The drawings show a sharpening guide for a file to be used in sharpening a saw chain. The guide comprises a substantially semi-cylindrical body 2 that is a close fit on a round file of predetermined size. A file 4 is shown in position in FIG. 3.

There is a first support 6 at one end of the body 2 to support and guide the file 4 during use and, in particular, to ensure that the file 4 remains within the guide. In the preferred embodiment illustrated there is a second support 8 at the end of the body 2 remote from the first support 6. The dimensions of the first and second supports 6 and 8 and of the semi-cylindrical body 2 is such that the file 4 and body 2 can reciprocate back and forth, during the filing motion, but the file 4 also can rotate readily within body 2 so that differing parts of the file can be used. However, the fit is reasonably close as, of course, the guide has to function to maintain a stable position for the file during sharpening.

Preferably the guide is of heat hardened steel although any appropriate material that is not affected by filing can be used.

As shown most clearly in FIG. 1 the first support 6 has an opening 10 to receive the round file 4 at the end of the guide. The guide is formed preferably from a single semi-cylindrical length. The material is then folded over at each end to form the cylindrical supports 6 and 8. The opening 10 may be formed either before or after the folding operation.

To use the guide according to the present invention the file is simply inserted in the opening 10 and moved to define a starting position in which the file is also received in the second support 8. The file 4 and body 2 move together during sharpening.

FIG. 3 illustrates a chain saw guide bar 12, formed with a peripheral channel 14 in conventional manner. FIG. 3 also shows the chain 16, which comprises inner links 18 with spaces between them, outer links 20 and cutter teeth 22. The links are joined by rivets 24 as, of course, the chain 16 is an endless chain that passes around the drive sprocket (not shown) and the arcuate end (also not shown) of the guide bar 12.

In use the guide, with the file 4 in place, is positioned as shown in FIG. 3. It has been found that best results are achieved if the body 2 is at an inclination of about 135 degrees to the top of the guide bar 12 at the start of the sharpening stroke of the file, with the lower edge being the leading edge. As the operator propels the file and body forward he turns the file and the body 2 so that the top edge of body 2 moves towards the cutter. At the end of the stroke the two edges of the body 2 are on a line at about 90 degrees to the bar 12, and may be at 80 degrees to the bar 12 with the top edge of body 2 parallel to and close to the top edge of the cutter tooth. If the operator turns the file further inward then the top edge of the body 2 will contact the top plate of the cutter tooth. This rotation of the file inward is the desirable method of sharpening used by experienced loggers. The angle of presentation should be such that the file is parallel to the top surface of the guide bar 12 and inclined to a line that is perpendicular to the plane of the side of the bar by about 35 degrees. In the case of certain chisel type chains manufacturers recommend that the file be inclined downwardly to the handle at an angle of 10 degrees. This can easily be done with the guide of the invention. As indicated it is important that the cutting chain be sharpened properly. Thus one edge of the guide sits in the lower part of the gullet 26 of the cutter tooth 22, as shown in FIG. 3. The guide prevents the file 4 filing into the cutter tooth side plate, which can cause a hook. The hook is dangerous to the operator as it increases the chance of kickback. Furthermore, the lower edge of the guide, in the gullet 26, prevents the bottom of the file filing downwardly, gouging the tops of the links 18 and 20. Some contact may take place but usually only after about ⅝ of the cutter tooth has been filed away. Even then the contact is brushing or light contact, not able to gouge the links 18 and 20.

Once the position has been properly established the cutter tooth is sharpened by simple reciprocation of the file 4, and the body 2 the sharpening taking place in the forward stroke. The file 4 should be rotated in the body 2 to ensure that differing parts of the file surface are brought into contact with the chain, thus ensuring most efficient use of the file.

There are left and right hand cutter teeth on a saw chain. When sharpening a right hand cutter tooth, the edge of the guide that is on top will be on the bottom when a left hand cutter tooth is sharpened.

The guide according to the present invention is of great simplicity. It is extremely light. Storage and carrying represent no problem. The guide can be stored and carried by placing it on the file. The invention gives the file the proper support or "lift" when in position in the cutter. The operator simply files forward with the bottom edge of the semi-cylindrical part rubbing on the bottom of the cutter gullet.

To maintain the correct cutting angles, most manufacturers recommend that about 1/10 of the file diameter should protrude above the cutter top plate while sharpening. The invention assures this as the thickness of the edge of the semi-cylindrical body that contacts the bottom of the cutter gullet can easily be made to be approximately the 1/10 portion of the file diameter.

I claim:

1. A sharpening guide for a file to be used in sharpening a chain saw chain, the guide comprising:
   a substantially semi-cylindrical body adapted to be a close fit on a round file of predetermined diameter;
   a first cylindrical support for the round file at one end of the body;
   the first cylindrical support including an opening to receive the round file; and
   the dimensions of the semi-cylindrical body and the first support allowing the file to rotate in the guide.

2. A guide as claimed in claim 1 including a second support at the end of the body remote from the first support.

3. A guide as claimed in claim 2 in which the second support has a closed end.

4. A guide as claimed in claim 2 in which the first and second supports are generally cylindrical.

5. A guide as claimed in claim 1 made of heat hardened steel.

6. A guide as claimed in claim 2 formed of a single semi-cylindrical length of material folded back at each end to form the first and second support.

7. A guide as claimed in claim 1 including a round file.

8. In combination a round file of predetermined diameter, appropriate to sharpen the chain of a chain saw;
   a guide for the round file comprising a substantially semi-cylindrical body adapted to be a close fit around the file;
   a first support at one end of the body;
   the first support including an opening, through which the round file passes; and
   the dimensions of the semi-cylindrical body in the first support allowing the round file to rotate in the guide.

9. A combination as claimed in claim 8 in which the round file includes a handle at a handle end of the round file and in which the first support is adjacent the handle end of the file.

10. A combination as claimed in claim 8 in which there is a second support at the end of the body remote from the first support so that the round file is supported at two points.

* * * * *

UNITED STATES PATENT AND TRADEMARK OFFICE
CERTIFICATE OF CORRECTION

PATENT NO. : 4,903,552

DATED : February 27, 1990

INVENTOR(S) : D. Kuwica

It is certified that error appears in the above-identified patent and that said Letters Patent is hereby corrected as shown below:

Column 2, line 41, after "is" insert -- a section --.

Column 2, line 42, before "guide" insert -- illustrates the --.

Column 2, line 57, change "(he" to -- the --.

Signed and Sealed this

Tenth Day of September, 1991

Attest:

HARRY F. MANBECK, JR.

*Attesting Officer*  *Commissioner of Patents and Trademarks*